Patented Dec. 14, 1943

2,336,785

UNITED STATES PATENT OFFICE 2,336,785

METHOD FOR THE PREVENTION OF SULPHATE DEPOSITS ON GLASS

Ernest W. Guernsey, Baltimore, Md., assignor to Consolidated Gas Electric Light and Power Company of Baltimore, Baltimore, Md., a corporation of Maryland No Drawing. Application April 22, 1941, Serial No. 389,813

7 Claims. (Cl. 49—77)

This invention relates to a method for preventing sulphate deposits on glass while the glass is being annealed.

Under certain conditions glassware, when being annealed in lehrs wherein the products of combustion come into direct contact with the glass, becomes coated with a film of sodium sulphate due to the action of sulphur compounds present in the combustion products. To overcome this difficulty it has heretofore been proposed in patent to Smith No. 2,198,745 granted April 30, 1940, to coat the belt which conveys the glassware through the lehr with sodium carbonate or other suitable alkaline substances. Although the sodium carbonate is effective in preventing the formation of the sulphate deposit, the procedure referred to has been found by experience to be possessed of grave disadvantages because flecks of the carbonate are blown from the belt onto the surfaces of the glassware as it passes through the lehr, the sodium carbonate having insufficient adherence to the metal surfaces of the belt to prevent the aforesaid action.

It is an object of this invention to provide a method for preventing sulphate deposits on glass that overcomes the difficulties and disadvantages incident to the use of the method heretofore proposed.

Another object of this invention is to provide a method for preventing sulphate deposits on glass which enables the use of sodium carbonate on the annealing belt without danger of flecks of the carbonate being blown onto the surface of the glass.

Another object of this invention is to provide a method for preventing sulphate deposits on glass which enables a closely adherent layer of sodium carbonate to be formed in situ on the annealing belt as it passes through the lehr.

Another object of this invention is to provide a method for preventing sulphate deposits on glass which is highly efficient and which at the same time is relatively simple in character as will hereinafter appear.

Other objects of the invention will appear as the description thereof proceeds.

I have discovered that it is possible to provide an alkaline coating on the belt employed for passing the glassware through the annealing lehr without danger of the coating flaking off of the belt and causing deposits of the alkaline coating material on the glass itself by mixing the sodium carbonate with certain materials hereinafter explained or by forming the sodium carbonate coating in situ under the heat of the lehr to cement the coating onto the belt.

I have discovered that the alkaline material may be satisfactorily retained on the annealing belt if mixed with a suitable clay in colloidal form, for example, bentonite. When such a clay is suspended in the sodium carbonate coating solution, a smooth uniform deposit is left on the belt surfaces after drying and this coating is not disrupted during the passage of the belt through the furnace. A practical coating for this purpose has been found to be a solution containing 7.5% bentonite and 5% sodium carbonate. However, various deposits of colloidal clay vary to some extent in their physical characteristics, and therefore some variation in the percentage of bentonite used may be found desirable depending upon variations in the physical characteristics of the clay used.

The mixture may be applied to any suitable form of conveyer belt of an annealing lehr of any suitable character, for example one provided with gas burners firing directly under a metal conveyer belt. Said mixture may be applied to the belt in any suitable way, as by means of a roller under which the belt is passed while the roller is immersed in a solution or suspension of the mixture. The coating applying apparatus is preferably so located that the coating dries before entering the lehr. The belt may pass continuously through the coating material, but this is not generally necessary since the activity of the coating is found to persist for a day or more. Therefore the belt may be passed through the coating material for a sufficient length of time to provide the desired coating thereon, and then the coating apparatus may be withdrawn, the treatment being repeated as often as necessary to maintain the effectiveness of the coating, as for example once a day.

Where a coating of colloidal clay and sodium carbonate is used as described, the thickness of the coating tends to increase, because ordinarily a new coating is applied before the old coating becomes ineffective, and if the old coating is not removed before a new coating is added, the coating after several applications becomes thick enough to again introduce the danger of flakes scaling away at some points from the metal surface of the belt. It is therefore preferable to associate a brush with the coating apparatus so that any loose scale which might otherwise be blown off into the lehr shall be removed before the new coating is applied.

I have also discovered that the adhesion of the sodium carbonate to the belt may be increased by using sodium silicate in the coating solution as a substitute for the colloidal clay. Satisfactory results have been obtained with solutions containing 3% of sodium carbonate and 3% of sodium silicate.

The preferred solution for coating the belt, however, is one containing sodium carbonate and sodium acetate, preferably in about equal proportions. Good results have been obtained with a solution containing 5% of each of the sodium carbonate and sodium acetate. This combination of materials has been found to be particularly advantageous because at the high temperature of the lehr the sodium acetate is decomposed, leaving sodium carbonate, without reducing the adherence of the coating to the belt. Thereby the effectiveness of the coating in removing sulphur oxides from the atmosphere is increased by the additional sodium carbonate without decreasing the adherence of the coating to the belt. The use of this material also has a distinct advantage inasmuch as only soluble materials are left on the conveyer surfaces and therefore an exhausted coating may be readily removed from the belt by solution, as by washing the belt with a spray before a new coating is applied.

Since sodium acetate decomposes to sodium carbonate to form an adherent coating as above referred to, sodium acetate may itself be used alone for coating the belt in preventing the deposit of sulphates on the glassware. Thus highly satisfactory results have been obtained by coating the belt with a 10% solution of sodium acetate, but the concentration may be varied considerably, the preferred concentration being the minimum to prevent the formation of the objectionable deposits on the glassware and this may vary to some extent under the varying conditions during annealing and may be determined in advance for the purpose of fixing the optimum value of concentration.

The reason for the superior adherent qualities of the novel coating material used in conformity with the present invention is not clear, but it may well be associated with the fact that in the case of using sodium acetate the crystals melt on the metal surface of the belt before decomposition takes place, so that whereas sodium carbonate applied as such and without mixture to the surface of the belt has been found by experience to flake off and introduce the difficulties above referred to, sodium carbonate formed in situ by the decomposition of the sodium acetate, whether used alone or in mixture with sodium carbonate, affords a coating that adheres firmly to the metal surfaces of the belt so as to avoid the flaking that has heretofore caused the difficulty.

It will therefore be perceived that by the present invention a novel method has been provided whereby the so-called "bloom" heretofore caused as a result of sulphate deposits on the glass as it passes through the annealing lehr may be avoided without introducing the difficulty heretofore experienced in the practice of the earlier method proposed and arising from the flaking of the alkaline coating material from the belt and its blowing onto and adherence to the surfaces of the glassware in the lehr. The invention further has the advantage that the desired coating of sodium carbonate may be formed in situ to obtain maximum effective action while avoiding the difficulties heretofore experienced with the flaking off of sodium carbonate. The method of the present invention is simple in character because the coating material may be readily applied, either continuously or intermittently as above explained, while an excess thickness of coating due to an accumulation of coating material may be readily avoided by brushing or washing as above explained.

While the invention has been described with considerable particularity as to the preferred practice, percentages, apparatus, etc., it is to be expressly understood that such has been done by way of exemplification. As will be apparent to those skilled in the art the invention as above disclosed may be carried out in a variety of ways which are contemplated within the broader aspects of the present invention. Reference is therefore to be had to the appended claims for a definition of said invention.

What is claimed is:

1. As an improvement in that method of preventing sulphate coatings on glass during annealing which employs the coating of the conveyor belt with an alkaline reacting compound that will absorb sulphurous gases in the lehr, the step of forming alkaline reacting compound on the belt by decomposing sodium acetate applied thereto by the heat of the annealing lehr to form a closely adherent non-flaking coating of sodium carbonate.

2. As an improvement in that method of preventing sulphate coatings on glass during annealing which employs the coating of the conveyor belt with an alkaline reacting compound that will absorb sulphurous gases in the lehr, the step of cementing alkaline reacting compound on the belt to form a closely adherent non-flaking surface layer by a material which decomposes under the heat of the lehr to form an alkaline reacting compound.

3. As an improvement in that method of preventing sulphate coatings on glass during annealing which employs the coating of the conveyor belt with an alkaline reacting compound that will absorb sulphurous gases in the lehr, the step of cementing alkaline reacting compound on the belt to form a closely adherent non-flaking surface layer by an adhesive material mixed with and preserving the sulphur absorbent characteristics of the alkaline reacting compound.

4. As an improvement in that method of preventing sulphate coatings on glass during annealing which employs the coating of the conveyor belt with an alkaline reacting compound that will absorb sulphurous gases in the lehr, the step of forming a coating of alkaline reacting compound on the belt by coating the same with a mixture of alkaline reacting compound and a material which decomposes under the heat of the lehr to form alkaline reacting compound and also acts as an adhesive to produce a non-flaking coat.

5. As an improvement in that method of preventing sulphate coatings on glass during annealing which employs the coating of the conveyor belt with an alkaline reacting compound that will absorb sulphurous gases in the lehr, the step of forming a coating of alkaline reacting compound on the belt by coating the same with a mixture of alkaline reacting compound and a material which acts to cement said compound to the belt and produce a non-flaking coat.

6. As an improvement in that method of preventing sulphate coatings on glass during annealing which employs the coating of the conveyor belt with an alkaline reacting compound that will absorb sulphurous gases in the lehr, the step of forming a coating of alkaline reacting compound on the belt by coating the same with a mixture of alkaline reacting compound and a sodium salt having the capacity to cement said compound to the belt and produce a non-flaking coat.

7. As an improvement in that method of preventing sulphate coatings on glass during annealing which employs the coating of the conveyor belt with an alkaline reacting compound that will absorb sulphurous gases in the lehr, the step of forming a coating of alkaline reacting compound on the belt by coating the same with a mixture of alkaline reacting compound and colloidal clay to cement said compound to the belt and produce a non-flaking coat.

ERNEST W. GUERNSEY.